US008351439B2

(12) United States Patent
Chu et al.

(10) Patent No.: US 8,351,439 B2
(45) Date of Patent: Jan. 8, 2013

(54) TECHNIQUES FOR MEASURING MEDIA STATISTICS ON FORKED MEDIA USING A DSP

(75) Inventors: Paul Chu, Saratoga, CA (US); Mohammed Taher Shaikh, Fremont, CA (US); Parameswaran Kumarasamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1032 days.

(21) Appl. No.: 11/417,820

(22) Filed: May 3, 2006

(65) Prior Publication Data

US 2007/0258471 A1      Nov. 8, 2007

(51) Int. Cl.
*H04L 12/28* (2006.01)
(52) U.S. Cl. ......................... 370/401; 370/241
(58) Field of Classification Search .................. 370/389, 370/392, 401, 241; 709/224; 398/25
See application file for complete search history.

(56) References Cited

U.S. PATENT DOCUMENTS

| | | | |
|---|---|---|---|
| 2002/0015387 A1* | 2/2002 | Houh | 370/250 |
| 2002/0110113 A1* | 8/2002 | Wengrovitz | 370/352 |
| 2003/0061345 A1* | 3/2003 | Kawasaki et al. | 709/224 |
| 2005/0047413 A1* | 3/2005 | Ilnicki et al. | 370/392 |
| 2006/0083511 A1* | 4/2006 | Edmunds et al. | 398/25 |
| 2006/0121916 A1* | 6/2006 | Aborn et al. | 455/456.5 |
| 2006/0165068 A1* | 7/2006 | Dalton et al. | 370/352 |
| 2006/0268914 A1* | 11/2006 | Smith | 370/412 |
| 2006/0285500 A1* | 12/2006 | Booth et al. | 370/250 |
| 2009/0262723 A1* | 10/2009 | Pelletier et al. | 370/352 |

OTHER PUBLICATIONS

Cisco Systems, Inc. "Using the Show Call Active Voice Command to Troubleshoot Voice Quality Issues", Apr. 30, 2005 document ID 40309; http://www.cisco.com/en/US/tech/tk652/tk698/technoligies_tech_no.

* cited by examiner

*Primary Examiner* — David Oveissi
(74) *Attorney, Agent, or Firm* — Fish & Richardson P.C.

(57) ABSTRACT

Techniques for determining media statistics for a communication from a first device to a second device are provided. The techniques include receiving media traffic for the communication at a network device configured to receive the media traffic from the first device. The network device is also configured to transmit the media traffic to the second device. A copy of the received media traffic is also forked to a processor. The received media traffic is sent to the second device while the forked copy of the media traffic is analyzed at the processor to generate media statistics about the media traffic.

17 Claims, 3 Drawing Sheets

TECHNIQUES FOR MEASURING MEDIA STATISTICS ON FORKED MEDIA USING A DSP

BACKGROUND OF THE INVENTION

Embodiments of the present invention generally relate to telecommunications and more specifically to techniques for forking media traffic to a processor for analysis.

Session border controllers (SBCs) or IP-to-IP gateways are being deployed by service providers to connect various networks running various voice-over IP (VoIP) protocols, such as H.323 and session initiation protocol (SIP). The SBC terminates and re-originates both signaling and media traffic for a VoIP communication between two devices. The media traffic is passed through the SBC as it is communicated from one device to the other. When a media packet arrives at the input of the SBC from a first device, a library, such as a real-time transport (RTP) library, updates the packet header with the SBC's IP address and port number. The packet is then forwarded to a second device. If real-time control protocol (RTCP) is used, the SBC overwrites the address imported with the packet with its own. By adding or overwriting the address and port, this causes any media returned from the second device to be received at the SBC, and not the first device. The processing performed by the SBC is intended to be minimal and add no substantial delay to the packet being sent. SBCs conventionally do not include a DSP, which may be used to generate media statistics. Thus, media statistics are not available for the media traffic.

A digital signal processor (DSP) may be inserted into the media traffic for the communication and generates media statistics. This involves media going through coding and decoding twice. The first time is for converting the media packets into a voice stream and the second time for converting the voice stream back into packets. This causes delay as the media has to go through two DSPs or two DSP channels connected back to back to have statistics generated on the voice stream. The delay introduced by the DSP affects the performance of the communication. Further, the delay is not desirable in a voice call or any other real-time communication because any delay affects the voice quality.

DETAILED DESCRIPTION OF EMBODIMENTS OF THE INVENTION

Figure 1:
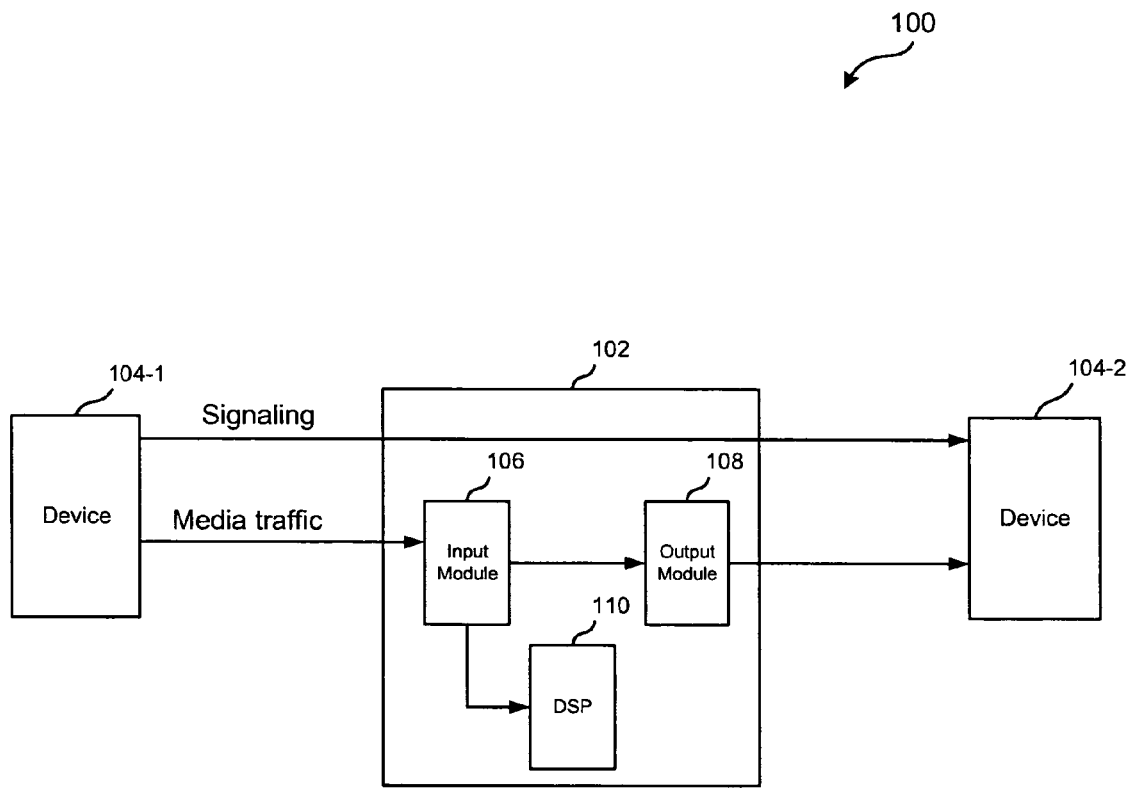
FIG. 1 depicts a system for processing of a communication according to one embodiment of the present invention.

FIG. 1 depicts a system 100 for processing of a communication according to one embodiment of the present invention. As shown, a session border controller 102, a first device 104-1 and a second device 104-2 are provided. It will be recognized that any number of devices 104 and session border controllers 102 may be provided in system 100.

Session border controller 102 may be any device that is used to forward media in a network. SBC 102 is inserted into a signaling and media path between first device 104-1 and second device 104-2. In one embodiment, SBC 102 may act as if it was the calling party (e.g. first device 104-1) and places a second call to second device 104-2. The effect of this is that signaling information and also media traffic (e.g. voice, video, etc.) passes through SBC 102. For example, first device 104-1 may think it is sending communications to second device 104-2 but in actuality the communication is being sent through SBC 102. Also, second device may think it is sending communications to first device 104-1 but is sending them through SBC 102. Eventually first device 104-1 and second device 104-2 do not know each others address and port, instead they know the address and port of SBC 102. This address hiding is provided by SBC 102.

SBC 102 may be useful in that it allows communications to be set up between two devices 104 that are using different signaling protocols (SIP, H.323, Megaco/MGCP, etc.). For example, first device 104-1 may communicate using SIP and second device may communicate using H.323.

Although a session border controller is described, it will be understood that embodiments of the present invention are not restricted to using a session border controller. For example, an IP to IP gateway may be used, or any other network device that is configured to be inserted in a communication between two devices 104.

Devices 104-1 and 104-2 may be any devices participating in a communication. For example, devices 104-1 may be participating in a VoIP telephone call. In one embodiment, device 104-1 includes an IP phone, a PSTN phone, IP gateway, a voice enabled IM client, a cellular phone, soft phone, or any other network device. Also, device 104-2 may be a second IP phone, PSTN phone, IP gateway, a voice enabled IM client, a cellular phone or any other network device. Also, device 104-2 may be a second session border controller 102. For discussion purposes, it is assumed that device 104-1 and device 104-2 are end devices that are participating in a communication.

As shown, device 104-1 sends signaling information and media traffic destined for device 104-2. However, SBC 102 is configured to receive the signaling information and media traffic. For example, device 104-1 may be configured to send all media traffic through SBC 102.

The signaling information may be any signaling that is used in establishing and controlling the communication. The media traffic may be any information that is being sent. For example, the media traffic may be real-time protocol (RTP) packets, real-time transport control protocol (RTCP) packets, User Datagram Protocol (UDP), Transfer Control Protocol (TCP) packets, or any other units of information. In one embodiment, the media traffic may include voice packets that include voice information for a phone call.

The media traffic is received at an input module 106 of SBC 102. Input module 106 is configured to pass the media traffic through to an output module 108. Also, input module 106 is configured to fork the media traffic to a digital signal processor (DSP) 110. The forking is done without any substantial delay to media traffic being sent to device 104-2. In forking the media traffic, a copy of the media traffic is generated and forked (e.g. sent) to DSP 110. The copying or forking of the media traffic may be performed using known processes.

DSP 110 may be any processor configured to analyze media traffic. Although a single DSP 110 is shown, it will be recognized that any number of DSP 110s may be provided. For example, DSP 110 may analyze media traffic to generate media statistics, such as quality of service (QoS) statistics, service level agreement (SLA) statistics, or any other information about the media traffic. The different types of media statistics that can be generated will be described in more detail below.

After analyzing the media traffic, DSP 110 drops the traffic. This is because the media traffic was forked and has already or will be sent to device 102-2.

Output module 108 receives the media traffic and is configured to send it to device 104-2. In one embodiment, output module 108 may add a return address for SBC 102, such as the address and port number for SBC 102. This preserves address hiding in that any responses to the packet from device 104-2 are sent back to SBC 102 instead of device 104-1. The address and port number of SBC 102 may be added to the packets of media traffic or may be over-written on the previous address and port number.

Accordingly, the media traffic is passed through to SBC 102 without inserting DSP 110 directly into the media stream to device 104-2. Thus, substantial delay is not introduced and the media stream quality sent towards 104-2 is kept intact. However, media statistics can still be obtained using the copy of the media traffic that is forked to DSP 110. This does not cause substantial delay in the sending of the media traffic to device 104-2.

Although the process is described as sending media traffic from device 104-1 to device 104-2, it will be recognized that this process may be full duplex in nature. For example, media traffic sent from device 104-2 to device 104-1 is passed through output module 108. Output module 108 may fork the media traffic to DSP 110 for analysis as described above. Further, input module 106 receives the media traffic, inserts the address and port number for SBC 102, and sends the media traffic to device 104-1.

Figure 2:
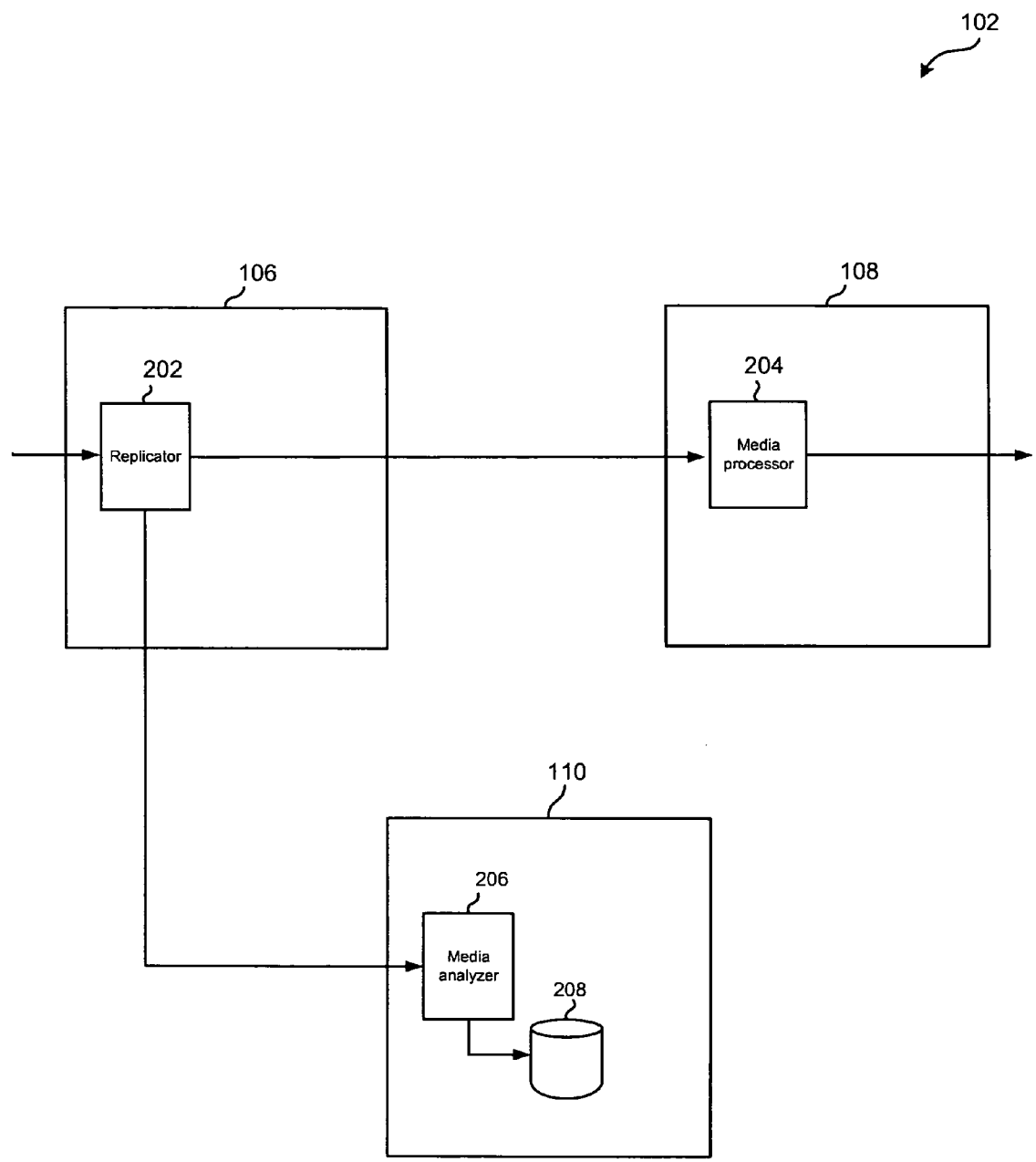
FIG. 2 describes a more detailed embodiment of a session border controller according to embodiments of the present invention.

FIG. 2 describes a more detailed embodiment of SBC 102 according to embodiments of the present invention. As shown, media traffic is received at a replicator 202 of input module 106. Replicator 202 may be configured in software, hardware, or any combination thereof. Replicator 202 forwards the media traffic to output module 108. Also, replicator 202 creates a copy of the media traffic and sends it to DSP 110. For the forking, an exact copy of the media traffic may be created. For example, a copy of a media packet is created.

A media processor 204 of output module 108 receives the media traffic from replicator 202, inserts the address and port number for SBC 102, and sends the traffic to 104-2.

Also, a media analyzer 206 of DSP 110 receives the copy of the media traffic. Media analyzer 206 analyzes the media traffic to generate any required statistics. The media statistics generated may be stored in storage 208. Media statistics may then be accessed by a reporting tool in order to generate reports for the media statistics.

Some statistics that can be generated include: round-trip delay, on-time RV play-out, gap-fill with silence, gap-fill with interpolation, gap-fill with redundancy, lost packets, early packets, late packets, etc.

Round-trip delay statistics include a voice packet round-trip delay between first device 104-1 and SBC 102 during a communication. Also, round trip delay can be measured between first device 104-1 and second device 104-2 by measuring media bi-directionally through SBC 102. It will be understood that other methods of measuring round-trip delay statistics will be appreciated, such as measuring round-trip statistics between first device The on-time RV play-out statistics may be the duration of voice play-out for information received on time for the communication. The voice play-out may be the time to output or play the voice information when it is received. The on-time RV play-out plus reiterations for the following gap-fill statistics will give the total voice play-out duration.

A gap-fill with silence statistic is the duration of a voice signal replaced with a signal played out during silence due to voice data not received on time (or lost) from a device on the communication. A gap-fill with interpolation statistic is a duration of a voice signal played out with a signal synthesized with parameters or samples of data preceding and following in time due to the voice data not being received on time (or lost) from a device for the communication. A gap-fill with redundancy is the duration of the voice signal played out with the signal synthesized from redundancy parameters available due to the voice data not being received on time (or lost) from a device on the communication.

A lost packet statistic is the number of lost packets during the communication. The early packets statistic is the number of received voice packets that arrive too early to store in a jitter buffer during the communication. The late packets statistic is the number of received voice packets that arrive too late to play out using a coder/decoder (CODEC) during the communication. It will be understood that other statistics may be generated, such as gap-fill with prediction, high water play-out delay, low water play-out delay, received delays, transmitted packets, received packets, number of bytes, or any other DSP-related statistics may be created.

In general, statistics related to QoS, SLA, or call detail records may be generated. The statistics for lost packets, early packets and late packets may be used to help identify which side of a network has good or bad quality. This may help isolate a problematic network quickly. For example, if SBC 102 connects two networks using different VoIP signaling protocols, one side of the network may be experience late or lost packets more so than the other side. Media statistics may then be used to identify which network is problematic.

QoS information may also be used to determine if SLAs are being adhered to. For example, QoS between device 104-1 and SBC 102, and between SBC 102 and second device 104-2 may both be measured. This will allow the user to determine which side of the network may be violating SLAs.

The above information may be included in a call detail record (CDR) generated by SBC 102. The CDRs may then be analyzed further to determine problems. For example, a CDR may be used to debug and show output information for troubleshooting purposes. Also, the media statistics that are generated by SBC 102 may also be used to debug, analyze and enable good call-reporting for communications.

Figure 3:
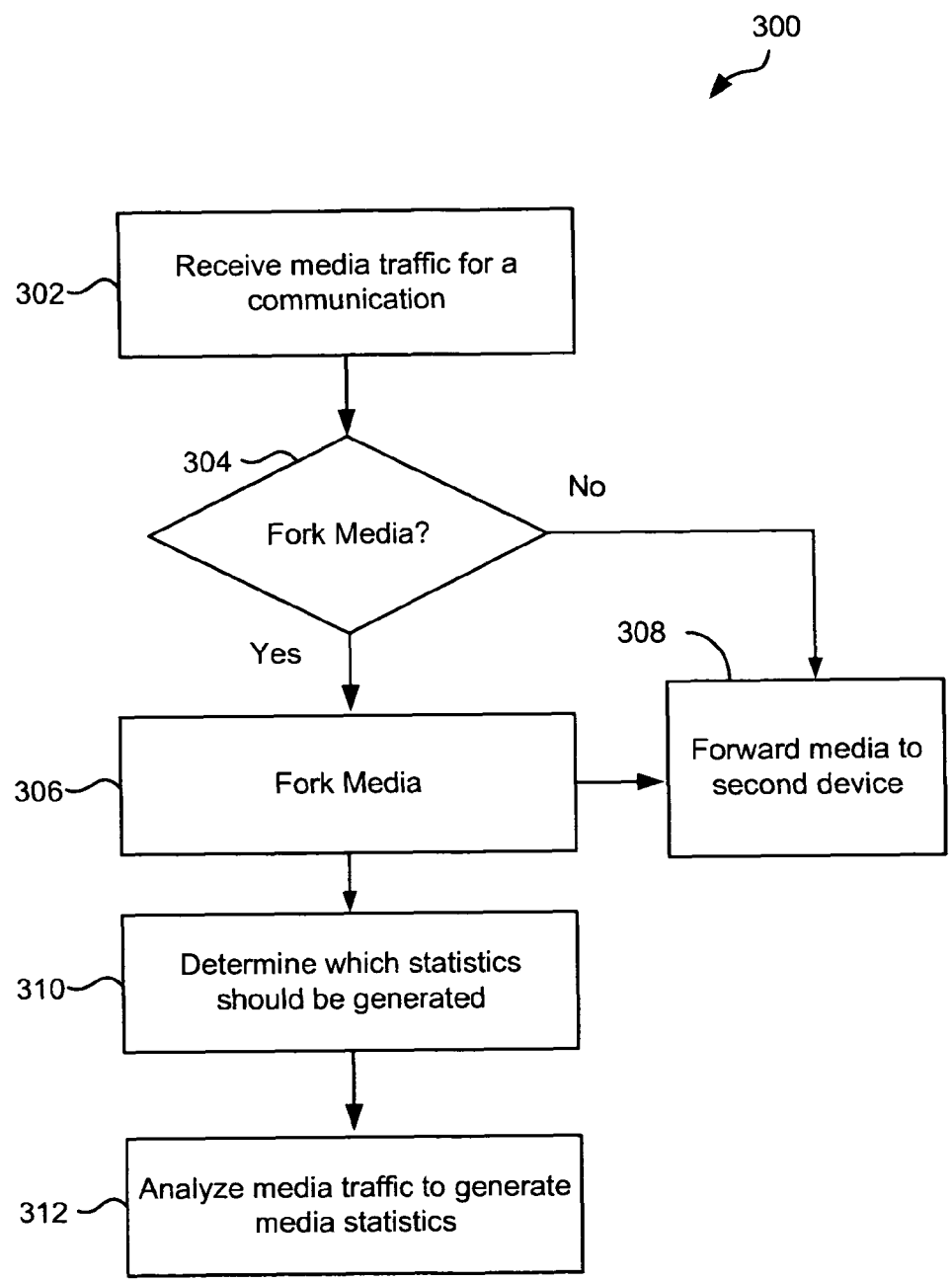
FIG. 3 depicts a simplified flowchart of a method for analyzing media traffic using forked media according to one embodiment of the present invention.

FIG. 3 depicts a simplified flowchart 300 of a method for analyzing media traffic using forked media according to one embodiment of the present invention. In step 302, media traffic is received for a communication. The communication may be from a first user using device 104-1 for a second user using device 104-2.

In step 304, session border controller 102 determines if the media traffic should be forked. For example, the process of forking media may be dynamic or used on a call by call basis. User profiles may be set up that indicate whether media statistics should be generated or not. For example, either the first user or the second user may specify that media statistics be generated for his/her calls.

Also, the media statistics may be generated when problems have been reported. Any other situations may also dictate whether statistics should be generated. In other embodiments, the media traffic may be forked on all communications.

In step 306, if the media traffic should be forked, the media traffic is forked to DSP 110. Also, in step 308, the media traffic is forwarded to second device 104-2.

If the media traffic is not forked, as discussed in step 308, the media traffic is forwarded to second device 104-2.

In step 310, it is determined which statistics should be generated for the communication. For example, a user profile may specify which statistics should be generated for the user.

Also, an administrator may specify the statistics to generate. For example, the administrator may specify statistics needed to analyze a problem in the network.

In step 312, the media traffic is analyzed to generate the statistics.

Embodiments of the present invention provide many advantages. For example, the media traffic is not substantially affected as DSP 110 is only used on forked media traffic. The cost increase for using DSP 102 may be minimized if DSP 102 is inserted only for selected calls. For example, a policy may be used to dynamically insert DSP 102 on calls. Thus, only certain media traffic for certain communications may be forked to DSP 110. Load is also not increased because the forked media traffic is dropped after DSP 110 analyzes it.

Although the invention has been described with respect to specific embodiments thereof, these embodiments are merely illustrative, and not restrictive of the invention. For example, although session border controllers are described, it will be understood that other network devices may be used. Also, although QoS and SLA statistics are described, it will be understood that any statistics for media may be generated.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:
    receiving, at a network device, a first call from a first device destined for a second device;
    responsive to receiving the first call, placing, by the network device, a second call to the second device such that the first device and the second device are connected through the network device for a communication session, wherein packets of media traffic and signaling traffic for the communication session pass through the network device;
    receiving, at the network device, packets of media traffic associated with the communication session;
    determining, by the network device, whether media statistics for the communication session are to be generated, wherein the determining comprises at least one of:
        examining a user profile corresponding to at least one of a user of the first device and a user of the second device for an indication whether media statistics are to be generated, and
        determining whether a problem has been reported for the communication session;
    based on determining that media statistics for the communication session are to be generated, forking, by the network device, a copy of the packets of media traffic to a processor, wherein the forking is performed such that a delay associated with generating media statistics for the communication session is limited;
    modifying, by the network device, the received packets of media traffic by adding a network address and port number of the network device to the packets of media traffic as a return address for the communication session such that the second device responds to the network device using the return address, wherein the forking is performed before adding the network address to the received packets of media traffic;
    sending, by the network device, the modified packets of media traffic to the second device; and
    analyzing, by the network device, the forked copy of the packets of media traffic at the processor to generate media statistics about the communication session, wherein the forking allows the network device to analyze the copy of the packets of media traffic using the processor without being in a path for the communication session between the first device and second device.

2. The method of claim 1, wherein the network device is positioned in both a signaling path and a media path between the first and second devices.

3. The method of claim 2, wherein the forked copy of the packets of media traffic is not analyzed directly in the media path.

4. The method of claim 1, wherein forking the packets of media traffic comprises:
    generating, by the network device, a copy of the packets of media traffic while passing through the received packets of media traffic to the second device.

5. The method of claim 1, wherein the network device comprises at least one of a session border controller and a gateway that is configured to receive packets of media traffic and signaling traffic for the communication session between the first device and the second device.

6. The method of claim 1, wherein the first device and the second device are configured to use different signaling protocols used to control communication of the packets of media traffic.

7. The method of claim 1, wherein the user profile corresponding to at least one of the user of the first device and the user of the second device specifies whether media statistics are to be generated for calls associated with respective user.

8. The method of claim 1, wherein analyzing the forked copy of the packets of media traffic at the processor to generate media statistics comprises:
    determining, by the network device, which media statistics should be generated for the communication session by examining at least one of a user profile corresponding to the user of the first device or the user of the second device that specifies which media statistics are to be generated, and a specification by an administrator regarding which media statistics are to be generated.

9. A network device comprising:
    a receiver configured to receive packets of media traffic for a communication between a first device and a second device, wherein upon the network device receiving a first call from the first device destined for the second device, the network device places a second call to the second device connecting the first device and the second device for a communication session through the network device such that the packets of media traffic and signaling traffic for the communication session pass through the network device;
    a replicator configured to fork a copy of the packets of media traffic based on a determination by the network device that media statistics for the communication session are to be generated, wherein the replicator is further configured to forward the forked copy of the packets of media traffic to a digital signal processor (DSP) while forwarding the received packets to an output module, wherein the determination comprises at least one of:
        examining a user profile corresponding to at least one of a user of the first device and a user of the second device for an indication whether media statistics are to be generated, and
    determining whether a problem has been reported for the communication session, and wherein forking is performed such that a delay associated with generating media statistics for the communication session is limited;
    the output module configured to:
        modify the received packets of media traffic using a media processor by adding a network address and port number of the network device to the packets of media traffic as a return address for the communication session such that the second device responds to the network device using the return address and send the modified packets of media traffic to the second device, wherein the forking is performed before adding the network address to the packets of media traffic, and send the modified packets of media traffic to the second device; and the DSP configured to receive the forked copy of the packets of media traffic from the replicator and configured to analyze the forked copy of the packets of media traffic using a media analyzer to generate media statistics about the communication session, wherein the forking allows the DSP to analyze the copy of the packets without being in a path for the communication session between the first device and second device.

10. The network device of claim 9, wherein the media statistics include quality of service and service level agreement related statistics.

11. The network device of claim 9, wherein the media analyzer is included in the DSP.

12. The network device of claim 9, wherein the replicator is configured to fork the copy of the packets of media traffic while passing through the received packets of media traffic to the second device.

13. The network device of claim 9, wherein the network device comprises at least one of a session border controller and a gateway that is configured to receive packets of media traffic and signaling traffic for the communication session between the first device and the second device.

14. The network device of claim 9, wherein the first device and the second device are configured to use different signaling protocols used to control communication of the packets of media traffic.

15. The network device of claim 9, wherein the user profile corresponding to at least one of the user of the first device and the user of the second device specifies whether media statistics are to be generated for calls associated with respective user.

16. The network device of claim 9, wherein the DSP is configured to determine which media statistics should be generated for the communication session by examining at least one of a user profile corresponding to the user of the first device or the user of the second device that specifies which media statistics are to be generated, and a specification by an administrator regarding which media statistics are to be generated.

17. A network device comprising:

means for receiving, at the network device, a first call from a first device destined for a second device;

a first processor; and instructions embedded in a non-transitory machine-readable medium for execution by the first processor and configured to cause the first processor to perform functions comprising:

responsive to receiving the first call, establishing a communication session between the first device and the second device such that packets of media traffic and signaling traffic for the communication session pass through the network device;

receiving, at the network device, packets of media traffic associated with the communication session;

determining, by the network device, whether media statistics for the communication session are to be generated, wherein the determining comprises at least one of:

examining a user profile corresponding to at least one of a user of the first device and a user of the second device for an indication whether media statistics are to be generated, and determining whether a problem has been reported for the communication session;

based on determining that media statistics for the communication session are to be generated, forking, by the network device, a copy of the packets of media traffic to a second processor, wherein the forking is performed such that a delay associated with generating media statistics for the communication session is limited;

modifying, by the network device, the received packets of media traffic by adding a network address and port number of the network device to the packets of media traffic as a return address for the communication session such that the second device responds to the network device using the return address, wherein the forking is performed before adding the network address to the received packets of media traffic;

sending, by the network device, the modified packets of media traffic to the second device; and analyzing, by the network device, the forked copy of the packets of media traffic at the second processor to generate media statistics about the communication session, wherein the forking allows the network device to analyze the copy of the packets of media traffic using the second processor without being in a path for the communication session between the first device and second device.

* * * * *